Patented Dec. 29, 1931

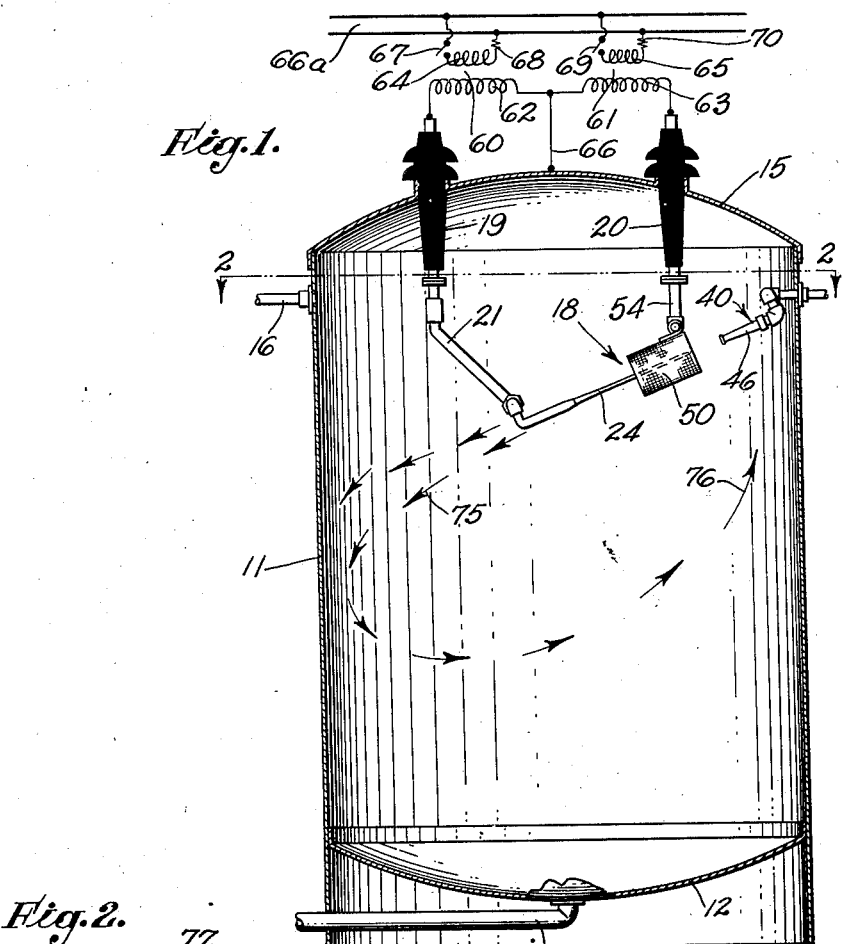
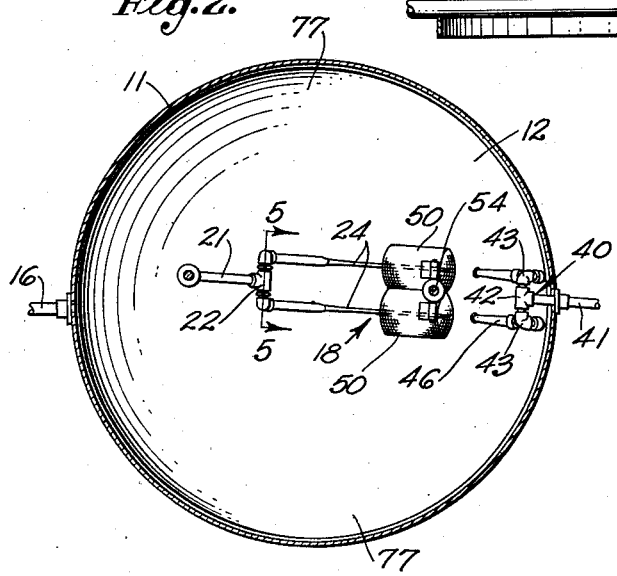

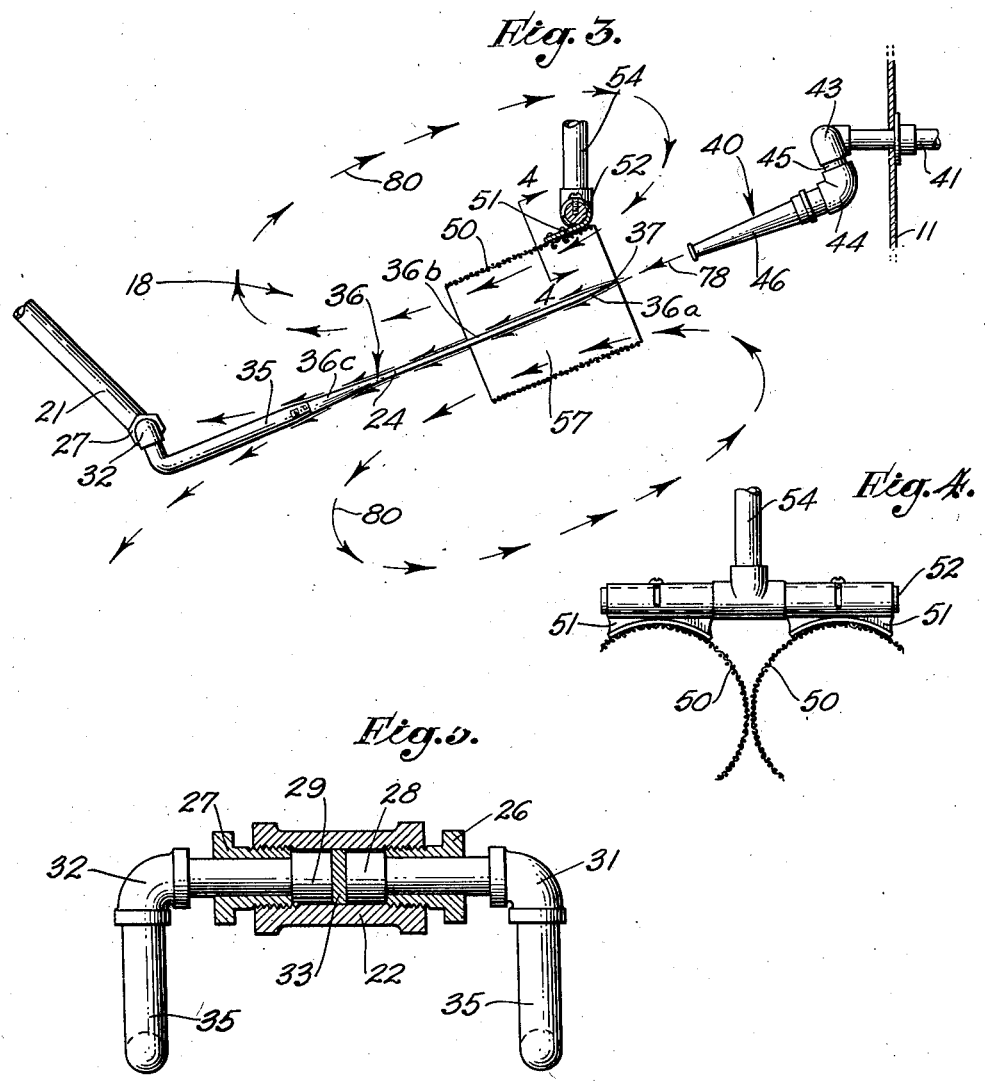

1,838,917

UNITED STATES PATENT OFFICE

HAROLD C. EDDY, OF LOS ANGELES, AND JOHN T. WORTHINGTON AND FRANCIS D. MAHONE, OF LONG BEACH, CALIFORNIA, ASSIGNORS TO PETROLEUM RECTIFYING COMPANY OF CALIFORNIA, OF LOS ANGELES, CALIFORNIA, A CORPORATION OF CALIFORNIA

DOUBLE-FIELD DEHYDRATOR

Application filed February 24, 1931. Serial No. 517,856.

Our invention relates to electrical treaters, and more particularly to a novel dehydrating system having a capacity larger than previous units, and a novel method of operation.

The conventional petroleum emulsion produced from certain wells is of the water-in-oil type, having minute dispersed water particles suspended in a continuous phase of oil. It is to this petroleum emulsion that our invention is particularly applicable, and in the succeeding description we will particularly describe our apparatus as applied to such an emulsion without limiting ourselves thereto.

It is well-known that the dispersed water particles may be agglomerated into larger masses by subjecting the emulsion to the action of a high-intensity electric field. It is well-known that the treating action increases in effectiveness as the potential gradient is increased. When the emulsion is subjected to high gradients there is a tendency, however, for the emulsion to short-circuit the electrodes, and in a co-pending application filed by Harmon F. Fisher, Serial No. 135,804, there is disclosed a system of concentric electrodes in which the central electrode is relatively small as compared to the outer electrode so that the field adjacent this central electrode is very intense. Emulsion is introduced into the most intense portion of the field in the form of a fluid envelop around the central electrode, this being done by a suitable deflector electrically connected to the central electrode.

It is an important object of the present invention to provide an electric treater in which a nozzle is spaced from a pointed end of a rod electrode, this nozzle forming a high velocity jet which is pierced by the rod to spread the jet into a fluid envelope flowing around the rod electrode.

It is a further object of this invention to maintain a difference in potential between the rod electrode and the nozzle means whereby the treating action takes place in the jet itself.

Other objects lie in a novel mounting, placement, and construction of a sleeve electrode surrounding the rod electrode to define a treating space through which the fluid envelope passes.

We have also found it possible to greatly increase the capacity of the treater, and the effectiveness of the treatment, by insulating both the rod electrode and the sleeve electrode from the tank, and maintaining a difference in potential between these electrodes which is greater than the difference in potential between the tank and either electrode. Such a dual-field system with other types of electrodes is shown and claimed in a co-pending application filed by H. C. Eddy, Serial 157,529, but it is an object of the present invention to form an improved system including this general arrangement of a pair of electrodes insulated from the tank and from each other.

Still another object of the invention lies in such a combination in which the nozzle is electrically connected to the tank so that the potential between the nozzle and either electrode is less than the potential between the electrodes.

The field set up between the nozzle and the rod electrode acts to preliminarily treat the emulsion, and allows the action of the main field around the rod electrode to be more effective than otherwise, and it is an important object of the invention to provide a method and apparatus wherein a flowing stream of emulsion is subjected to successive electric fields without opportunity of settling between fields, and also to provide a method wherein the successive fields are set up with different potentials thereacross.

We have found it desirable to allow the agglomerated phase to separate in the same tank as the actual agglomeration step takes place, this agglomerated phase dropping to the lower end of the tank while the lighter continuous phase rises to the top of the tank from which it may be withdrawn. It has been found advantageous, and it is an object of this invention, to incline the nozzle and the rod electrode from the horizontal so that the jet of incoming emulsion is directed in a downward inclined direction.

Still a further object of the invention is to utilize such an inclined nozzle which is directed nonradially into the tank so as to set up a rotary motion of the body of liquid therein.

Other objects and advantages lie in the particular construction of the electrode system, in the novel methods hereinafter disclosed, as well as in other features which will be apparent to those skilled in the art.

Referring to the drawings—

Fig. 1 is a sectional view of a preferred embodiment of our invention.

Fig. 2 is a section taken on the line 2—2 of Fig. 1.

Fig. 3 is an enlarged view, partially in section, of the electrode system shown in Fig. 1.

Fig. 4 is a sectional view taken on the line 4—4 of Fig. 3.

Fig. 5 is a sectional view taken on the line 5—5 of Fig. 2.

Referring particularly to Fig. 1, we have illustrated a tank 11 provided with a bottom drum 12 and a water draw-off pipe 13 connected thereto. Similarly, a dome or upper drum 15 is provided on the upper end of the tank 11, there being an oil draw-off pipe 16 positioned in the tank 11 for withdrawing dry oil from a section below the dome 15 and just above an electrode structure 18 in the tank.

Two insulators 19 and 20 extend through the dome 15 and support the electrode structure 18, the insulator 19 supporting an arm 21 provided at its lower end with a T-fitting 22 which in turn supports a pair of inner electrodes, each electrode being indicated by the numeral 24. It is preferable in some installations to adjustably mount the inner electrodes relative to the T-fitting 22, and this can conveniently be accomplished by the apparatus shown in Fig. 5 wherein the T-fitting 22 is shown as being provided with glands 26 and 27 threaded therein and engaging cylindrical heads 28 and 29 respectively connected to the inner electrodes through elbow structures 31 and 32. Tightening the glands 26 and 27 locks the inner electrodes together and moves the heads 28 and 29 into engagement with a pressure member 33.

The construction of each of the inner electrodes is illustrated in Fig. 3, and is shown as including a base member 35 threaded into one of the elbows 31 or 32, there being a rod electrode 36 secured to the base member 35. This rod electrode is circular in cross-section and is tapered to a sharp point indicated by the numeral 37, the taper from this point to the rear of the rod structure being very gradual. In the preferred form we prefer to use a very sharp point with a gradual taper on a tip portion 36a of the rod electrode, the intermediate section 36b being substantially cylindrical, and the rear portion 36c again tapering. The base member 35 is also tapered to correspond to the taper of the rear portion 36c of the rod electrode, this combination resulting in an electrode structure which is quite sharp at one end and gradually increases in diameter in stream-line form.

A nozzle structure 40 is mounted inside of the tank 11, this structure including an inlet pipe 41 secured to the tank and providing a T-fitting 42 on the inner end thereof to which elbows 43 are connected, each elbow being connected to another elbow 44 by a nipple 45 (see Figs. 1, 2, and 3). Secured to each elbow 44 is a nozzle 46 which is in axial alignment with the rod electrode 36 thereadjacent. These nozzles 46 are preferably designed to throw a high velocity stream-line jet having a minimum of turbulence therein so that the jet holds together for a material distance after being discharged from the nozzle. In practice, we have found it very satisfactory to use high velocity nozzles such as are used on certain fire-fighting equipment for throwing streams of water for a considerable distance. The size of nozzle utilized can be varied over wide limits, but we prefer to utilize a nozzle which throws a stream of liquid which is not materially larger in diameter than the diameter of the rod electrode 36.

The electrode structure 18 may also include a pair of sleeve electrodes, each indicated by the numeral 50, which are secured to brackets 51 adjustably mounted on an arm 52, these sleeve electrodes being concentric with the rod electrode 36 and surrounding this rod electrode at or near the point 37, as best shown in Figs. 1 and 3. The arm 52 is secured to a support 54 which is detachably connected to the insulator 20. The sleeve electrodes 50 are preferably made of screen, though this construction is in nowise essential to the invention, it being entirely possible to secure satisfactory results when impervious sleeve electrodes are used, though screen gives somewhat better results on most emulsions.

Each rod electrode 36 and its corresponding sleeve electrode 50 cooperate in defining an annular treating space 57, and it is very desirable that a very intense field be established in this treating space. In accomplishing this end we have found it advantageous to maintain the electrodes 36 and the electrodes 50 at potentials above the potential of the tank 11, and to maintain the potential between each rod electrode and its sleeve electrode considerably greater than the potential between the tank 11 and either of the rod or sleeve electrodes. One method of accomplishing this end is shown in Fig. 1 wherein two transformers 60 and 61 providing secondaries 62 and 63 and primaries 64 and 65 are shown. One terminal of each secondary is connected to the tank through a conductor 66, the remaining terminal of the secondary 62 being connected to the rod electrodes through a conductor passing through the insulator 19. Similarly, the other conductor of the secondary 63 is connected to the sleeve electrodes 50 through a conductor extending through the insulator 20. The primary 64 of the transformer 60 is connected to a supply line 66a through a switch 67 and a choke coil 68, while the primary 65 of the transformer 61 is similarly connected to the supply line through a switch 69 and a choke coil 70. The transformers may thus be individually energized by closing the switches 67 and 69, and these transformers are so connected that the potentials of the secondaries 62 and 63 are additive whereby energization of both transformers will establish a difference in potential between the rod electrode and its corresponding sleeve electrode which is substantially twice the potential between the tank 15 and either the rod electrode or the sleeve electrode. Such an arrangement also sets up a potential between the nozzle structures and the rod electrodes. Thus, assuming that each transformer is rated at 10,000 volts it will be clear that the potential between the sleeve electrodes 50 and the tank will be 10,000 volts, as will also the potential between the rod electrodes and the tank, but the potential between the rod electrode and its corresponding sleeve electrode will be double this amount; namely, 20,000 volts. So also, the potential between the nozzle structure and either the rod electrodes or the sleeve electrodes is 10,000 volts.

The advantage of such a connection is at once apparent, for it is thus possible to secure a field having an effective difference in potential of 20,000 volts without requiring the use of an insulator capable of withstanding this potential. High voltage insulators are both expensive and often unsatisfactory, and this construction thus results in a saving in cost and in a structure in which operating difficulties are reduced to a minimum, and shut-downs due to insulator defects are eliminated. So also to establish a field having an effective potential of 20,000 volts in the conventional manner, it would be necessary that the potential between one of the electrodes and the tank be 20,000 volts. Thus, if such a high potential existed between the sleeve electrode and the tank an auxiliary field would be set up therebetween, which auxiliary field might in itself line up the water particles and short-circuit the electrodes. By the system disclosed, however, this auxiliary field is reduced to substantially one-half of what it would be in the conventional treater and the current consumption correspondingly reduced.

It should not be understood that we are limited to the use of two separate transformers. It is entirely possible to utilize a single transformer having a center tap connected to the conductor 66, or to use a single transformer having two primary windings with a center tap secondary, or to use certain auto-transformer connections. While we have described the use of two, 10,000 volt transformers with a combined voltage between the electrodes of 20,000 volts we do not wish to limit ourselves to this voltage for in actual practice we have used voltages a great deal higher on certain oils before the emulsion was wholly broken. For example, two 36,000 volt transformers giving a combined voltage of 72,000 volts have been used with excellent results on an emulsion which could not be broken at lower voltages. The limit of the voltage possible to use is controlled by the dielectric strength of the dry oil itself which surrounds the sleeve electrode 50. In some cases we have found it advantageous to use a different voltage on the rod than on the shield.

It will be noted from Figs. 1 and 3 that the rod electrodes 36 and the nozzles 46 are slightly inclined downward from the horizontal. This is an important auxiliary detail of the invention; first, because it allows a lengthening of the path between the nozzles 46 and that wall of the tank 11 toward which these nozzles are directed, second, because a downward directed jet of liquid tends to hold together over a longer distance than an upward directed jet, and, third, because of the desirable circulation set up in the tank 11. The agglomerated water phase of the emulsion is, of course, heavier than the dry oil phase, and tends to move downward into the bottom of the tank 11, while the dry oil tends to rise upward therein. By directing the nozzles downward in the tank, the mixture of agglomerated water particles and oil is directed downward in the tank and tends to move downward and inward as indicated by the arrows 75 of Fig. 1. The body of dry oil in the top of the tank is thus not disturbed by this jet, as would be the case if the nozzles were directed horizontally or were inclined upward. This allows the electrodes to be positioned closer to the top of the tank, and also allows the dry oil to be drained off through the pipe 16 at a point only slightly above the electrode structures. This downward inclination has been found to give a very desirable and fast settling action due possibly to the impinging of the mixture on the walls of the tank and possibly to the washing action which takes place when the mixture moves downward in the tank, as indicated by the arrows 75.

Similarly, we have found it advantageous to direct the nozzles 46 into the tank in a non-radial direction. This is best illustrated in Fig. 2. The angle of divergence between the axis of the jet and a radius of the tank need not be large, an angle of a few degrees being sufficient to secure the desired result; namely, a rotation of the liquid in the tank 11. This rotation tends to increase the rate of separation of the agglomerated water and oil, and also tends to cause the mixture moving as indicated by the arrows 75 to move circumferentially in the tank so that the dry oil separating from the mixture in the lower portion of the tank may rise to the top of the tank in paths close to the walls of the tank 11. Most of this oil moves upward as indicated by the arrows 76 of Fig. 1 and through the open spaces 77 (shown in Fig. 2) which lie on opposite sides of the electrode structure.

It has been found that the most desirable angle of dip of the nozzles 46, as well as the angle between the axis of the nozzles and a radius of the tank, varies with different emulsions. For this reason we have shown the electrodes and nozzles as being adjustable. Thus, to adjust the position of the rod electrodes, the glands 26 and 27 may be loosened and the rod electrodes turned relative to the T-fitting 22. If further adjustment is desired the arm 21 may be replaced with another arm which is of slightly less or slightly greater length, or bent differently. Similarly, the sleeves 50 are adjustably mounted so that the dip of the central axis thereof can be changed by pivoting these sleeves about the arm 52. The support 54 can also be replaced with a support which is shorter or longer than the one shown. Finally, the nozzles 46 may be pivoted on the nipples 45, or the elbows 43 may be pivoted relative to the T-fitting 42 thereby giving a desired adjustment thereto. When the apparatus is once set up for a given emulsion, it is not, however, necessary to make any further adjustments and the apparatus can be tightly clamped in the desired position. These adjustments are not, however, essential to the invention. A treater can be designed which operates quite successfully on all types of emulsions, though possibly not as efficiently as it would if designed for a particular emulsion.

In starting up the treater, it is preferable to completely fill the tank 11 with substantially dry oil. The switches 67 and 69 may then be closed and a stream of emulsion forced through the pipe 41 and nozzles 46 under the requisite pressure. Each nozzle forms a jet 78 which travels at extremely high velocity, often as high as 40 feet per second. This jet should have a minimum or turbulence therein and should not spread materially after leaving the nozzle. When the jet reaches the point 37, it is pierced thereby, and the stream-line surface of the rod electrode spreads the jet into a fluid envelope which contacts and immediately surrounds the rod electrode 36.

By proper design of the rod electrode and the nozzle 46 it is possible to cause this fluid envelope to move along the rod electrode 36 and through the treating space without materially diverging. This is relatively easy especially when the sleeve electrode is relatively short, as indicated in Figs. 1 and 3, and we have found that this sleeve electrode need not be made long in view of the fact that the treating action is extremely rapid. The time that the emulsion is in the very intense portion of the electric field in the treating space 57 is, of course, minute, but the agglomerating action is extremely rapid and a sleeve electrode having a diameter of six inches, and a length of ten inches, the rod electrodes providing a mean diameter of five-sixteenths of an inch, has been found to be very satisfactory, though we obviously are not limited to these dimensions. If it becomes necessary to use a higher voltage in order to break the emulsion, we have found it advisable to increase the diameter of the sleeve electrode 50 to a greater diameter, depending on the dielectric strength of the dry oil itself, the dielectric strength of the emulsion undergoing treatment and the dielectric strength of the layer of dry oil and emulsion which has become mixed while passing through the electric field existing between the rod and shield. For a voltage of 33,000 volts we have found that it is necessary to increase the diameter of the shield to eight inches for some oils and ten inches for others. From an electric standpoint better results are obtainable by decreasing the size of the rod, but we have found that it is not practicable from a mechanical standpoint to make it smaller than five-sixteenths of an inch.

After the fluid envelope has passed through the treating space in clinging relationship with the rod electrode 36, this fluid envelope can diverge therefrom. In actual practice, however, it has been found that the stream of liquid follows quite closely along the rod electrode throughout its length, and over a portion of the base member 35. Thereafter the mixture impinges against that wall of the tank 11 opposite the nozzles 46, and the liquid in the tank is set into rotation. As previously described, the heavier water phase drops to the lower end of the tank 11, while the lighter phase rises to the top of the tank after being separated from the water.

It has been found that there is little or no tendency to short-circuit the electrodes 36 and 50 due to the confining of the fluid envelope immediately around the rod electrode and due to the fact that the fluid envelope does not bridge the distance between these electrodes. As an added precaution, however, the electrode structure is positioned in the upper end of the tank so as to be surrounded by substantially dry oil, a portion of this dry oil being drawn into and through the outer portion of the treating space by the jetting action of the stream discharged from the nozzle 46, this circulation of dry oil through the outer portion of the treating space being indicated by the arrows 80 of Fig. 3.

It is not necessary, however, that the treater be filled with dry oil prior to energization of the field. Thus, if the tank is filled with emulsion, it is desirable to close only the switch 69, thus establishing a difference in potential between the sleeve electrode and the tank. This will start a dehydrating action in the auxiliary field therebetween and will dry out the emulsion in the tank. If desired a small stream of emulsion may be forced through the nozzles to insure circulation during this drying step. It will be apparent that when the switch 69 is closed and the switch 67 is open, a field will be set up in the treating space due to the fact that the rod electrode will be connected to the tank through the energized secondary of the transformer 62. This field is also effective in drying the emulsion in the tank 11. Unless the emulsion is dry, or nearly so, the switch 67 may be closed and the normal amount of emulsion supplied through the nozzles 46.

It has also been found possible to close only the switch 67, thus establishing a difference in potential between the rod electrodes and the nozzles 46. With certain emulsions a very desirable treating action takes place in the jet 78 itself, and the high velocity nature of this jet prevents any short-circuiting even though the field intensity adjacent the point of the rod electrode is extremely high. This procedure can also be used in drying out the emulsion in the tank preparatory to setting the treater into normal operation, and in many instances can be used to the entire exclusion of the sleeve electrodes to effect the agglomerating action.

While we have disclosed the electrode structure as being submerged in a liquid, this is not in all events necessary. Agglomeration of the dispersed water particles is effected regardless of the presence of any dry oil in the treating space. Thus, if the liquid level in the tank 11 was maintained below the electrode structures, and the jet of emulsion moved through the treating space and into contact with the wall of the tank 11, entirely satisfactory results are obtained with many emulsions. In this event the fluid envelope of emulsion moving through the treating space is surrounded by gas. In this event actual separation of the constituent phases preferably takes place in a container separated from the tank 11.

Treaters constructed along these lines have been found to have a much larger capacity than do other types of treaters heretofore used. We attribute this both to the high intensity field obtainable in the treating space as compared with any auxiliary fields in the treater and also to the high velocity of flow from the nozzles and the extreme rapidity of the agglomeration. Another very important reason for the desirable treating action found to exist is because of the relationships between the two fields, one formed between the nozzle and rod electrode and the other formed around the rod electrode. The former apparently has a desirable preliminary treating effect which makes the latter field more effective, especially when the potential between the nozzle and rod electrode is lower than between the rod and sleeve electrodes, whereby the stream of emulsion is subjected to successive fields established by successively larger potentials.

While we have shown one embodiment of our invention, it will be at once apparent that we are not limited thereto, it being possible to change both the form and arrangement of our treater without departing from the spirit of this invention. So also our invention is not limited to all of the features shown and described herein, but certain sub-combinations thereof and processes are, we believe, new and novel in the art.

We claim as our invention:

1. In an electric treater, the combination of: an electrode in the shape of a rod, one end of which is pointed; a nozzle axially aligned with said rod and providing an unobstructed orifice shaped to throw a stream-lined high velocity jet of emulsion toward the point of said rod, whereby said rod pierces said jet of emulsion and spreads said jet into a fluid envelope around said rod, and which envelope moves along and in contact with said rod for a material portion of its length; and means for impressing a difference in potential between said rod and said nozzle whereby an electric field is set up between said pointed end of said rod and the end of said nozzle.

2. In an electric treater, the combination of: a stream-lined electrode in the shape of a rod and comprising a body portion of substantially cylindrical shape and a pointed end portion with a relatively long and sharp point thereon; a nozzle axially aligned with said rod and shaped to throw a stream-lined jet of emulsion toward the point of said rod, whereby said rod pierces said jet of emulsion and spreads said jet into a fluid envelope around said rod, and which envelope moves along and in contact with said body portion of said rod; and means for establishing an electric field around said rod through which said fluid envelope moves before materially diverging from said rod.

3. In an electric treater, the combination of: an electrode in the shape of a rod, one end of which is pointed; a nozzle axially aligned with said rod and shaped to throw a stream-lined jet of emulsion toward the point of said rod, whereby said rod pierces said jet of emulsion and spreads said jet into a fluid envelope around said rod, and which moves along and in contact with said rod; a sleeve electrode around said rod and surrounding said fluid envelope in spaced relationship therewith; and means for impressing a difference in potential between said rod and said sleeve electrode and between said rod and said nozzle.

4. A combination as defined in claim 3 including a tank surrounding said sleeve electrode and containing a dielectric medium which is drawn into said field by the jet action of said jet.

5. In an electric treater, the combination of: a tank; a sleeve electrode supported in said tank and insulated therefrom; a rod electrode extending axially into said sleeve electrode to define a treating space and insulated from said sleeve electrode and from said tank; nozzle means electrically connected to said tank for introducing emulsion into said treating space; and means for establishing a difference in potential between said rod electrode and sleeve electrode and between each of said electrodes and said tank, the former difference in potential being greater than the potential between either electrode and said tank.

6. In an electric treater, the combination of: a tank containing a liquid; nozzle means directing an emulsion into said liquid in a direction slightly inclined from the horizontal, said emulsion comprising two phases; means for electrically treating said emulsion to agglomerate one phase thereof, the heavier of said phases settling to the bottom of said tank and the lighter phase rising to the top of said tank; and means for separately withdrawing said phases from said tank.

7. In an electric treater, the combination of: a tank containing a liquid; nozzle means directing an emulsion into said liquid in a direction slightly inclined from the horizontal and non-radially with respect to said tank in a manner to set said body of liquid in said tank into rotation, said emulsion comprising two phases; electrode means for treating said emulsion discharged from said nozzle to agglomerate one phase thereof, the heavier of said phases settling to the bottom of said tank and the lighter phase rising to the top of said tank; and means for separately withdrawing said phases from said tank.

8. A method of treating an emulsion, which includes the steps of: setting up a plurality of electric fields, the potential across each field being successively higher; and moving a stream of said emulsion through said fields in succession and without allowing separation of the phases of said emulsion between fields.

9. In an electric treater, the combination of: a sleeve electrode; a nozzle spaced from one end of said sleeve electrode and providing an orifice designed to throw a high velocity jet of emulsion entirely through said sleeve electrode, said jet having a minimum of turbulence so as to remain intact for a considerable distance after leaving said nozzle and being directed axially with respect to said sleeve electrode; and a relatively long and narrow rod extending axially through said sleeve electrode in alignment with said jet of emulsion, said rod providing a sharp point which pierces said jet to form this jet into a fluid envelope moving through said sleeve electrode and not spreading from the surface of said rod to such an extent as to bridge the distance between said rod and said sleeve during its passage through said sleeve, the treated emulsion leaving the vicinity of said rod only after being discharged from said sleeve.

10. In an electric treater, the combination of: a tank; a sleeve electrode supported in said tank and insulated therefrom; a central electrode in the shape of a rod extending centrally through said sleeve electrode; a supporting means spaced a distance from one end of said sleeve electrode and supporting one end of said central electrode, the other end of said central electrode being tapered to provide a relatively long and sharp point; a nozzle means axially aligned with said central electrode and with the axis of said sleeve electrode and spaced a distance from the other end of said sleeve electrode, said nozzle means providing an orifice designed to throw a high velocity stream of emulsion entirely through said sleeve electrode, said stream of emulsion being pierced by said pointed end of said central electrode to spread said stream of emulsion into a fluid envelope moving completely through said sleeve electrode and toward said supporting means; and means for setting up an electric field adjacent said central electrode for treating said stream of emulsion.

11. In an electric treater, the combination of: a nozzle forming a high velocity jet of emulsion of such character that it would normally tend to remain intact for a considerable distance after leaving said nozzle; a rod axially aligned with said nozzle and providing a tip portion and a rear portion, said tip portion being spaced from said nozzle and providing a sharp point which pierces said jet of emulsion to form this jet into a fast-flowing fluid envelope flowing longitudinally along and in contact with said rod without materially diverging therefrom; supporting means for said rod and comprising an arm connected to said rear portion and angularly disposed with respect thereto to extend out of the path of travel of said emulsion whereby said emulsion may flow from said rear portion of said rod; and means for establishing an electric field for treating said emulsion.

12. In an electric treater, the combination of: a vertically disposed tank the upper end of which contains a separated oil phase and the lower end of which contains a separated water phase; nozzle means extending in the upper portion of said tank and positioned at one side thereof to direct a high velocity stream of emulsion across said tank and into impinging contact with an opposed wall thereof, said nozzle means being inclined downward from the horizontal whereby the distance between the point of impingement and said nozzle is lengthened and whereby said stream of emulsion is directed into the lower end of said tank rather than into said separated oil phase in the upper end of said tank; and electrode means for treating said emulsion in said stream to agglomerate the water phase thereof whereby separation of the water and oil phases takes place in said tank.

13. In an electric treater for petroleum emulsions, the combination of: a tank containing a separated oil phase of the emulsion in the upper end thereof and a separated water phase of the emulsion in the lower end thereof; a rod electrode in said tank and insulated therefrom, said rod providing a pointed end portion formed with a sharp point; a nozzle means spaced from said rod electrode and axially aligned therewith and with said point; means for supplying emulsion to said nozzle means under pressure to form a high velocity jet of emulsion flowing toward said rod electrode, said point of said electrode piercing said jet of emulsion and forming it into an envelope moving along said rod electrode without material spreading from the surface of said rod electrode; a sleeve electrode positioned in said oil phase in the top of said tank and surrounding said rod electrode and said fluid envelope of emulsion but being of sufficient diameter so that said envelope of emulsion does not spread into engagement therewith as it moves therethrough, the space inside said sleeve electrode and around said fluid envelope being filled with a stream of said oil phase drawn therein by the jet action of said jet of emulsion; and means for impressing a potential difference between said rod electrode and said sleeve electrode and between each of said electrodes and said tank, the former potential difference being greater than the potential difference between said tank and either electrode.

14. In an electric treater for treating a petroleum emulsion, the combination of: a sleeve positioned with an end thereof in open communication with a liquid of higher dielectric strength than the emulsion to be treated; a nozzle discharging into said liquid a smooth-flowing stream of said emulsion directed axially with respect to said sleeve so as to move therethrough, the jet action of said stream of emulsion drawing an envelope of said liquid into said sleeve around said stream of emulsion; an electrode in the form of a relatively thin rod extending axially through said sleeve toward said nozzle and providing a sharp point in alignment with, but spaced from, said nozzle whereby said point pierces said stream of emulsion and forms said stream into a fluid envelope moving along and in contact with said rod electrode and in contact with said liquid, said liquid confining said fluid envelope around said rod electrode; and means for establishing a difference of potential between said nozzle and said rod electrode.

15. A combination as defined in claim 3 in which the potential difference between said rod and sleeve electrodes is greater than the potential between the tank and either the rod or the sleeve electrode, and in which the potential between said rod electrode and said tank is unequal to the potential between said sleeve electrode and said tank.

In testimony whereof, we have hereunto set our hands at Long Beach, California, this 14th day of February, 1931.

HAROLD C. EDDY.
JOHN T. WORTHINGTON.
FRANCIS D. MAHONE.